United States Patent
Dyer et al.

(10) Patent No.: US 10,340,709 B2
(45) Date of Patent: Jul. 2, 2019

(54) ELECTRIC BATTERY RAPID RECHARGING SYSTEM INCLUDING A MOBILE CHARGING STATION HAVING A COOLANT SUPPLY LINE AND AN ELECTRICAL SUPPLY LINE

(75) Inventors: Christopher K. Dyer, Madison, NJ (US); Michael L. Epstein, Bedminster, NJ (US); Duncan Culver, Howell, NJ (US)

(73) Assignee: Lightening Energy, Dover, NJ (US)

( * ) Notice: Subject to any disclaimer, the term of this patent is extended or adjusted under 35 U.S.C. 154(b) by 1016 days.

(21) Appl. No.: 14/235,714

(22) PCT Filed: Jun. 26, 2012

(86) PCT No.: PCT/US2012/044218
§ 371 (c)(1),
(2), (4) Date: Jun. 11, 2014

(87) PCT Pub. No.: WO2013/019336
PCT Pub. Date: Feb. 7, 2013

(65) Prior Publication Data
US 2014/0292260 A1    Oct. 2, 2014

Related U.S. Application Data

(60) Provisional application No. 61/513,189, filed on Jul. 29, 2011.

(51) Int. Cl.
*H02J 7/00*    (2006.01)
*B60L 53/10*    (2019.01)
(Continued)

(52) U.S. Cl.
CPC ............ *H02J 7/0027* (2013.01); *B60L 1/003* (2013.01); *B60L 3/0046* (2013.01); *B60L 53/11* (2019.02); *B60L 53/14* (2019.02); *B60L 53/31* (2019.02); *B60L 53/53* (2019.02); *B60L 53/55* (2019.02); *B60L 53/63* (2019.02); *B60L 53/64* (2019.02); *B60L 53/65* (2019.02); *B60L 53/665* (2019.02);
(Continued)

(58) Field of Classification Search
CPC ..... H02J 7/0029; H02J 7/0027; B60L 11/185; B60L 11/1825
USPC .......................................... 320/107, 108, 109
See application file for complete search history.

(56) References Cited

U.S. PATENT DOCUMENTS 4,415,847 A * 11/1983 Galloway ........... H01M 10/365
165/300
H000777 H * 5/1990 Natarajan .............. C21D 1/667
148/660
(Continued)

FOREIGN PATENT DOCUMENTS

JP    10223263 A * 8/1998 ............ H01M 10/50

*Primary Examiner* — Richard Isla
*Assistant Examiner* — Manuel Hernandez
(74) *Attorney, Agent, or Firm* — Davidson, Davidson & Kappel, LLC

(57) ABSTRACT

A method for rapidly recharging a military or a non-military device having an electric battery is provided. The method includes recharging the military or non-military device and the recharging includes delivering coolant to the military or non-military device to cool the electric battery. A military device, a non-military non-vehicular device, a mobile charging station and a stationary charging station are also provided.

17 Claims, 9 Drawing Sheets

(51) Int. Cl.

| | | |
|---|---|---|
| *B60L 53/14* | (2019.01) | |
| *B60L 53/31* | (2019.01) | |
| *B60L 1/00* | (2006.01) | |
| *B60L 3/00* | (2019.01) | |
| *H01M 10/625* | (2014.01) | |
| *H01M 10/6567* | (2014.01) | |
| *H01M 10/6561* | (2014.01) | |
| *B60L 53/64* | (2019.01) | |
| *B60L 53/63* | (2019.01) | |
| *B60L 53/65* | (2019.01) | |
| *B60L 53/66* | (2019.01) | |
| *B60L 58/26* | (2019.01) | |
| *B60L 58/27* | (2019.01) | |
| *B60L 53/53* | (2019.01) | |
| *B60L 53/55* | (2019.01) | |

(52) U.S. Cl.
CPC ............... *B60L 58/26* (2019.02); *B60L 58/27* (2019.02); *H01M 10/625* (2015.04); *H01M 10/6561* (2015.04); *H01M 10/6567* (2015.04); *H02J 7/0029* (2013.01); *H02J 7/0052* (2013.01); *H02J 7/0073* (2013.01); *B60L 2240/34* (2013.01); *B60L 2240/545* (2013.01); *B60L 2240/547* (2013.01); *B60L 2240/549* (2013.01); *B60L 2270/46* (2013.01); *H02J 7/0004* (2013.01); *Y02E 60/721* (2013.01); *Y02T 10/7005* (2013.01); *Y02T 10/705* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 6,426,606 B1* | 7/2002 | Purkey | ................... | F02N 11/14 320/103 |
| 6,786,226 B2* | 9/2004 | Crook | ................... | B60K 1/04 137/1 |
| 6,997,173 B2 | 2/2006 | MacDougall | | |
| 8,587,253 B2* | 11/2013 | Dyer | ................... | B60L 11/1809 180/65.21 |
| 9,233,618 B2* | 1/2016 | Dyer | ................... | B60L 1/003 |
| 9,786,961 B2* | 10/2017 | Dyer | ................... | H01M 10/486 |
| 2002/0026376 A1* | 2/2002 | Shioda | ................... | G06Q 30/02 705/26.35 |
| 2002/0028376 A1 | 3/2002 | Yamame et al. | | |
| 2005/0202310 A1* | 9/2005 | Yahnker | ................... | B25F 5/008 429/62 |
| 2005/0246557 A1* | 11/2005 | Vanzante | ................... | G06F 1/266 713/300 |
| 2005/0285563 A1* | 12/2005 | Yoneda | ................... | H01M 10/613 320/112 |
| 2006/0022633 A1* | 2/2006 | Nguyen | ................... | H02J 7/0003 320/106 |
| 2007/0285052 A1* | 12/2007 | Jeon | ................... | H01M 10/0413 320/112 |
| 2008/0238360 A1* | 10/2008 | Stone | ................... | H01M 2/1027 320/107 |
| 2008/0277173 A1* | 11/2008 | Midrouillet | ................... | B60K 1/04 180/65.1 |
| 2009/0239130 A1* | 9/2009 | Culver | ................... | H01M 2/206 429/50 |
| 2009/0256523 A1* | 10/2009 | Taguchi | ................... | B60L 11/1816 320/109 |
| 2009/0273310 A1* | 11/2009 | Flack | ................... | B60L 11/1818 320/107 |
| 2010/0192447 A1* | 8/2010 | Cabahug | ................... | F41C 23/22 42/84 |
| 2010/0277121 A1* | 11/2010 | Hall | ................... | B60L 11/182 320/108 |
| 2011/0120670 A1* | 5/2011 | Doss | ................... | G06F 1/1628 165/80.1 |
| 2011/0181242 A1* | 7/2011 | Lee | ................... | H02J 7/0003 320/110 |
| 2012/0018752 A1* | 1/2012 | Fujiwara | ................... | H01L 33/0095 257/94 |
| 2012/0041855 A1* | 2/2012 | Sterling | ................... | B60L 3/0046 705/34 |
| 2012/0089256 A1* | 4/2012 | Marchitto | ................... | F03D 9/00 700/276 |
| 2013/0020993 A1* | 1/2013 | Taddeo | ................... | H02J 7/0027 320/109 |
| 2015/0054460 A1* | 2/2015 | Epstein | ................... | B60L 11/187 320/109 |
| 2015/0295452 A1* | 10/2015 | Dyer | ................... | H02J 7/34 307/23 |

\* cited by examiner

ELECTRIC BATTERY RAPID RECHARGING SYSTEM INCLUDING A MOBILE CHARGING STATION HAVING A COOLANT SUPPLY LINE AND AN ELECTRICAL SUPPLY LINE

The present invention relates generally to electric battery recharging and more specifically to an electric battery rapid recharging system and method for military and non-military applications.

BACKGROUND OF INVENTION

The military uses various devices in a number of different environments and for a number of different purposes. Military devices which include an electric battery are often used in an unpredictable and unforeseeable manner and in locations where external electrical power is not readily accessible. Military devices which include an electric battery include armed and unarmed transportation vehicles, artillery devices, and other devices carried in the field by military personnel. Extra batteries may be carried in support of such military devices due to the limited energy content of electric batteries and the length of time needed to recharge electric batteries. The weight and volume of the extra batteries may impair the mobility of military devices and personnel as well as adding higher cost and disposal problems. While an increased battery energy density would reduce the weight and volume of the extra batteries, unfortunately, the availability of batteries with increased energy density is only slowly increasing. In non-military applications, extra batteries may be purchased to avoid an inconveniently long time to recharge.

BRIEF SUMMARY OF THE INVENTION

The present invention provides a method for rapidly recharging a military device having an electric battery. The method includes rapidly recharging the military device and the recharging includes delivering coolant to the military device to cool the electric battery.

A mobile rapid charging station is also provided. The mobile rapid charging station includes a charging source providing an electrical charge; a coolant source providing coolant; and a connector having both an electrical supply section delivering the electrical charge and a coolant supply section delivering the coolant, and capable of connecting to a military device.

A military device is also provided. The military device includes an electric battery powering the military device, a charging connector receptacle, a coolant conduit between the electric battery and the receptacle, and an electrical power connection between the electrical battery and the receptacle.

A non-military non-vehicular device is also provided. The non-military non-vehicular device includes an electric battery powering the non-military non-vehicular device, a charging connector receptacle, a coolant conduit between the electric battery and the receptacle and an electrical power connection between the electric battery and the receptacle.

A method for rapidly recharging a device having an electric battery for powering the military device is also provided. The method includes moving a mobile charging station to the location of the device and rapidly recharging the electric battery using the mobile charging station. The recharging includes delivering coolant to the device to cool the electric battery during the recharging.

A method for rapidly recharging a device having an electric battery for powering a device is also provided. The method includes moving a mobile charging station to the location of the device and rapidly recharging the electric battery to at least a 50% capacity within ten minutes. The recharging includes delivering coolant to the device to cool the electric battery during the recharging.

A method for recharging a non-military non-vehicular device having an electric battery is also provided. The method includes recharging the non-military non-vehicular device. The recharging includes delivering coolant to the non-military non-vehicular device to cool the electric battery.

BRIEF DESCRIPTION OF THE DRAWINGS

The present invention is described below by reference to the following drawings, in which.

DETAILED DESCRIPTION

Because of the unpredictable and unforeseeable manner and the remote locations in which military devices are used, it may be advantageous to power the military devices using electric batteries that are quickly recharged using rapid recharging stations that are mobile or are located at military bases. Combining the availability of rapid charging with overnight charging, may further increase the convenience and appeal of powering military devices with electric batteries. Increased production of rapidly-rechargeable electric batteries and rapid recharging stations for military purposes may also achieve economies of scale that may increase the use of rapidly-rechargeable electric batteries and rapid recharging stations in non-military vehicles and non-military non-vehicular applications.

Embodiments of the present invention provide high power DC electric supply charging stations capable of delivering up to 300 kW per electric battery (e.g., for 6 minutes charging of a 30 kWh electric battery) or more together with a coolant for cooling the electric battery during charging so that the battery does not overheat (up to ~50 kW of heat for example may be expected to be generated during 6 minutes of charge time). Conventional cooling techniques, such as cooling the surface or exterior of high voltage electric batteries, may not efficiently cool the heat generated by rapid charging stations delivering up to 300 kW or more per electric battery. Because heat generated by charging is primarily generated internally within the electric battery, cooling the external surface of the electric battery is inefficient and high temperature gradients within the battery stack itself may lead to battery damage and early failure due to an undesirable rise in temperature, increasing costs and the likelihood of dangerous thermal runaway of the battery.

Further, embodiments of the present invention may allow for an efficient and safe method of internal battery stack cooling during high rate charging and may provide a unique and highly effective universal thermal management system. Additionally, the embodiments only add minimal onboard volume and weight to military devices powered by electric batteries because the coolant and an optional heat exchanger are external to the military devices and are applied only during charging.

Figure 1A:
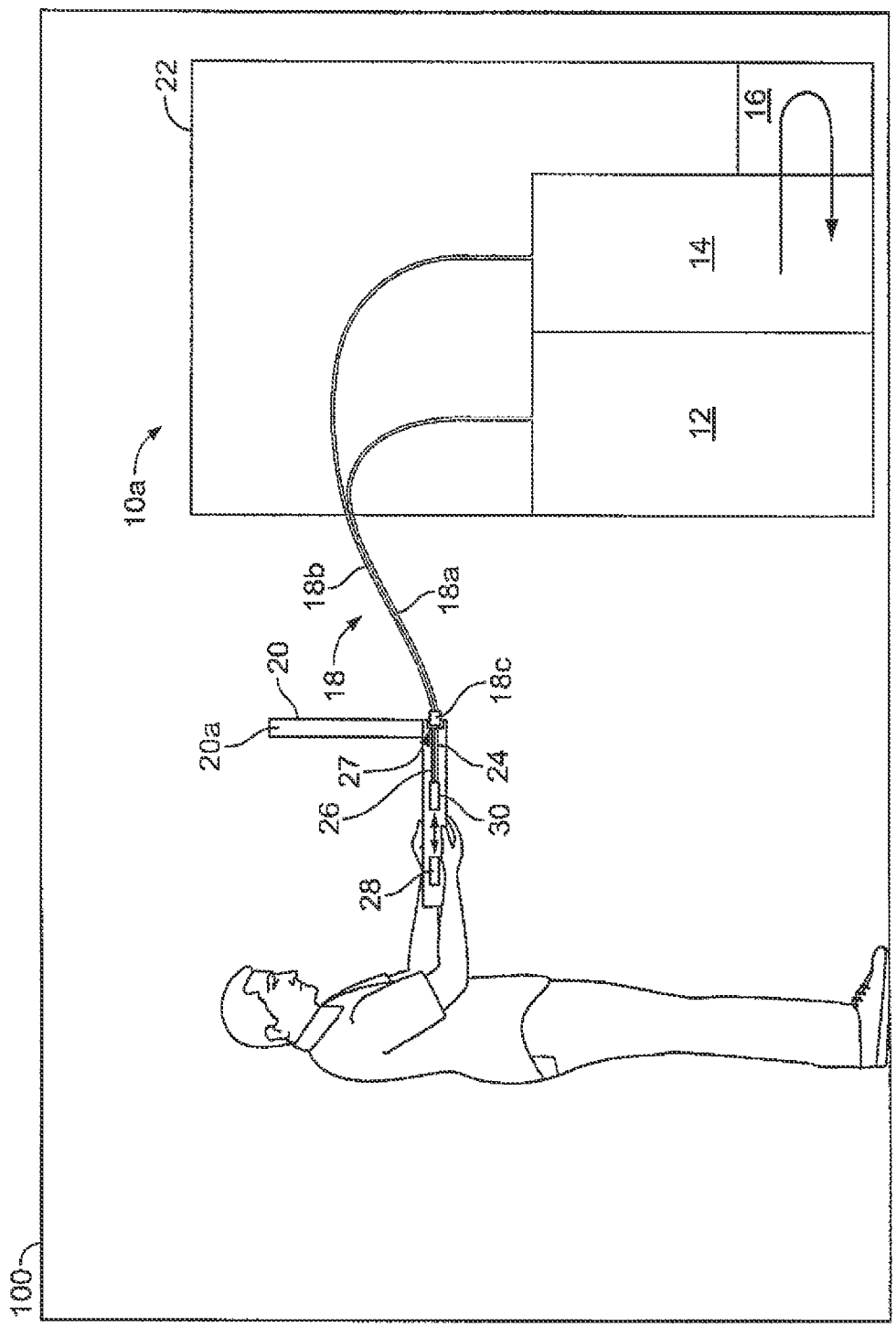
FIG. 1a schematically shows a rapid battery charging station for charging military devices powered by electric batteries according to an embodiment of the present invention.
Figure 1B:
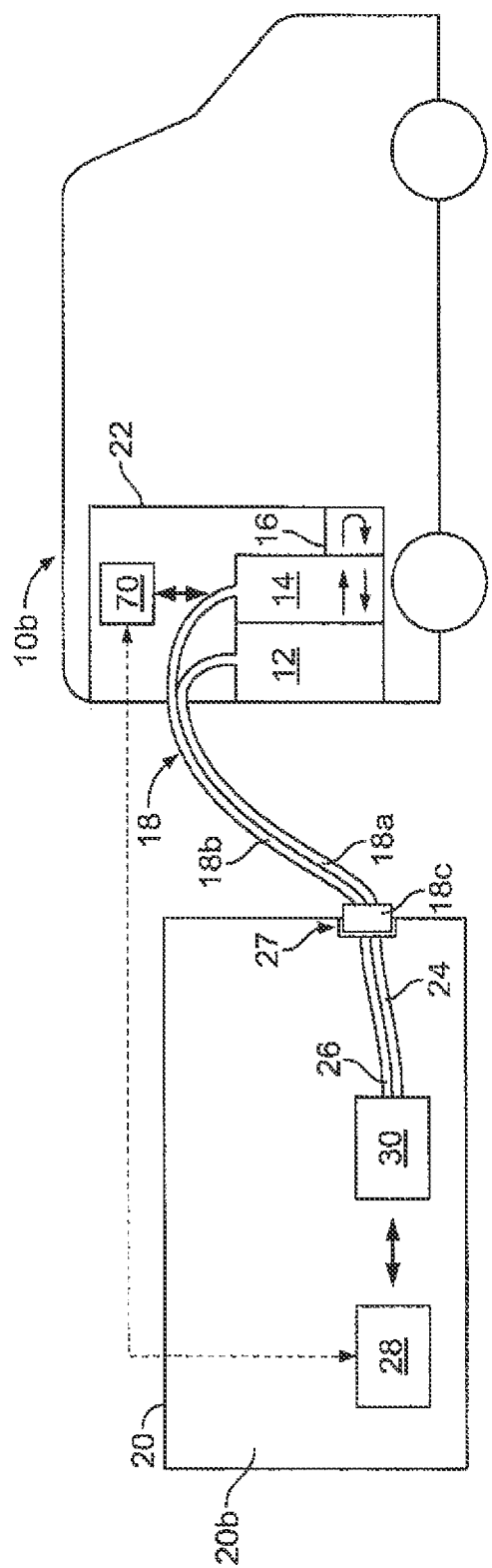
FIG. 1b schematically shows a mobile rapid battery charging station for charging military devices powered by electric batteries according to another embodiment of the present invention.
Figure 5:
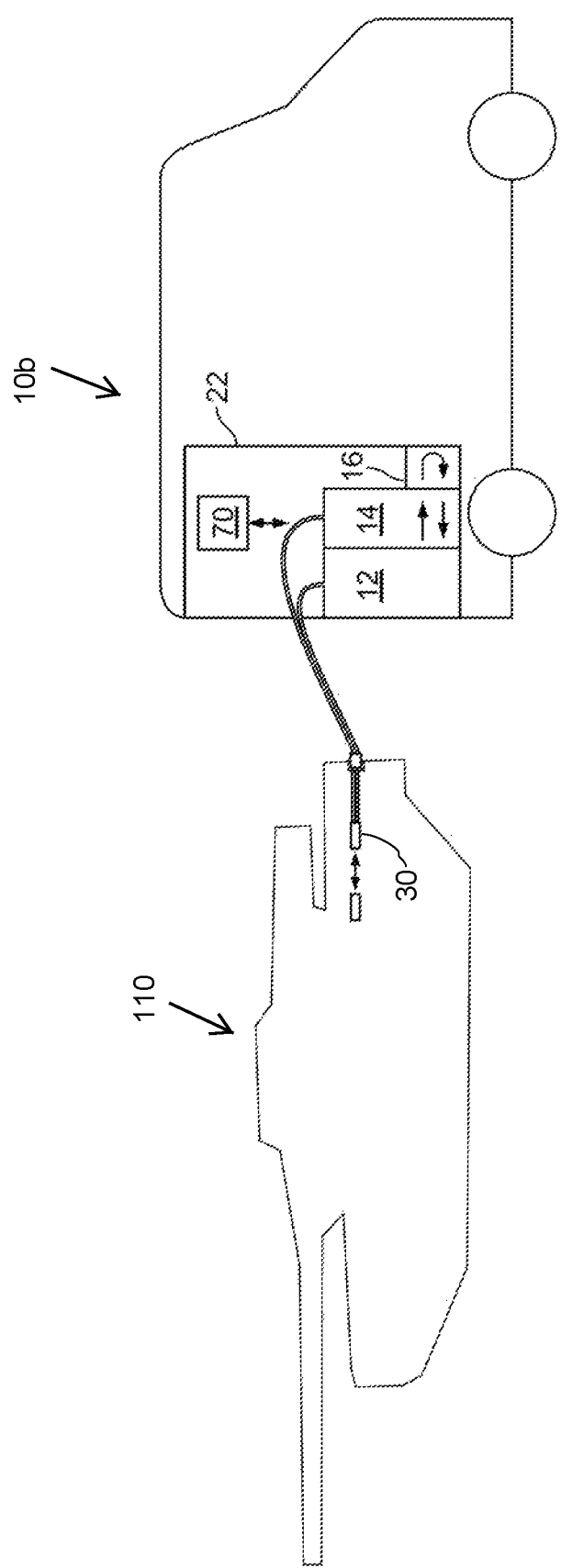
FIG. 5 schematically shows an electric battery of a tank being charged by a rapid battery charging station.
Figure 6:
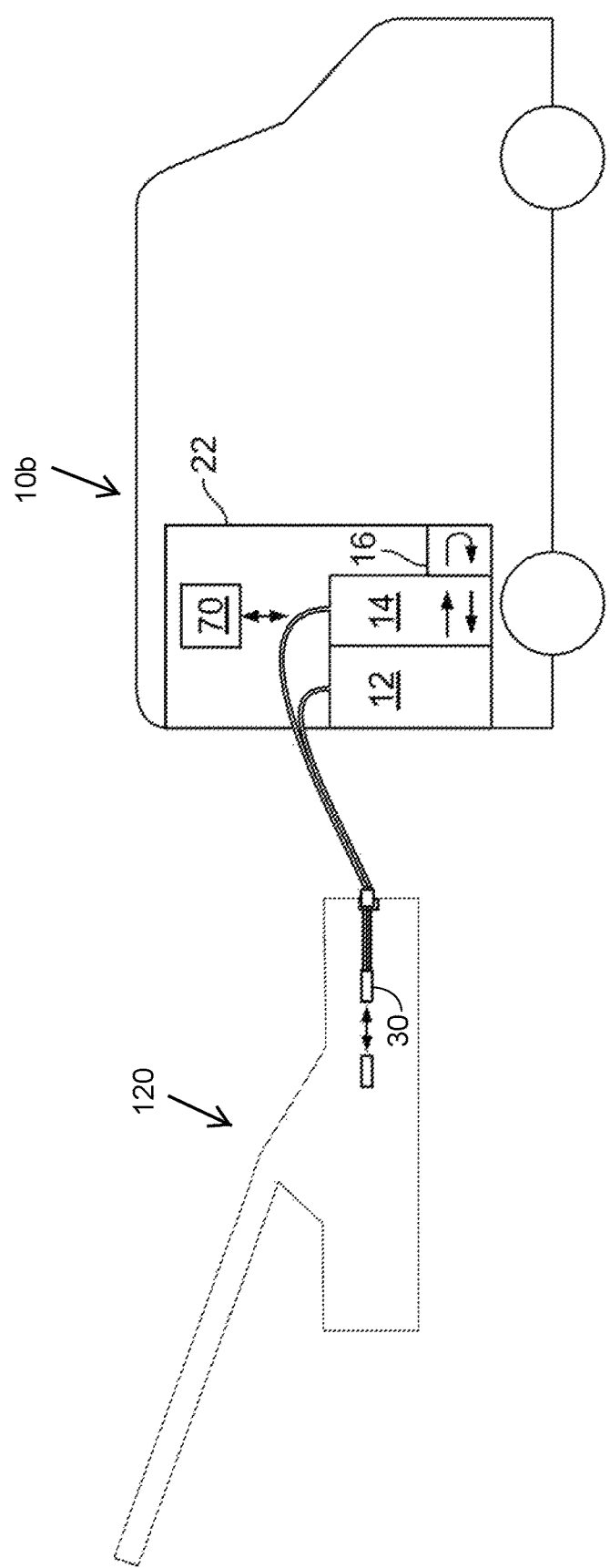
FIG. 6 schematically shows an electric battery of a rail gun being charged by a rapid battery charging station.

FIGS. 1a and 1b schematically show rapid charging stations 10a, 10b respectively for charging military devices 20 or non-military devices powered by electric batteries 30 according to embodiments of the present invention. In some preferred embodiments, military devices 20 include land combat and transportation vehicles, such as armored personnel carriers, light armored vehicles, mine protected vehicles, self-propelled howitzers, 4×4 utility vehicles, command and forward observation vehicles, self-propelled mortars, self-propelled guns, tanks 110 (as schematically shown in FIG. 5), artillery trucks, air defense command vehicles, C4i equipment, unmanned combat vehicles (i.e., drones), robots and infantry fighting vehicles. In other preferred embodiments, military devices 20 include stationary applications including battery powered back-up systems and UPS for command and control systems such as C4i and for hospitals as well as primary energy sources for artillery devices such as rail guns 120, as schematically shown in FIG. 6. In additional preferred embodiments, military devices 20 include devices carried by military personnel, such as power packs, radios, handheld computers, Global Positioning Systems and encryption devices. In even further preferred embodiments, military devices 20 include components of command stations, such as telemetry systems. In more preferred embodiments, military devices 20 include aircraft and marine vehicles.

In other embodiments, rapid charging stations 10a, 10b may be used for charging non-military devices that are powered by electric batteries. In preferred embodiments, non-military devices may include non-vehicular applications powered by batteries and examples of such non-military devices benefiting from rapid recharging include power tools, portable electronics, video cameras, UPS back-up systems, emergency lighting, computers, servers, back-up generators, telemetry systems, medical equipment and other devices powered by electric batteries may be charged by rapid charging stations 10a, 10b. In additional preferred embodiments, non-military devices may include electric vehicles including cars, trucks, electric boats, ships and aircraft.

Figure 2:
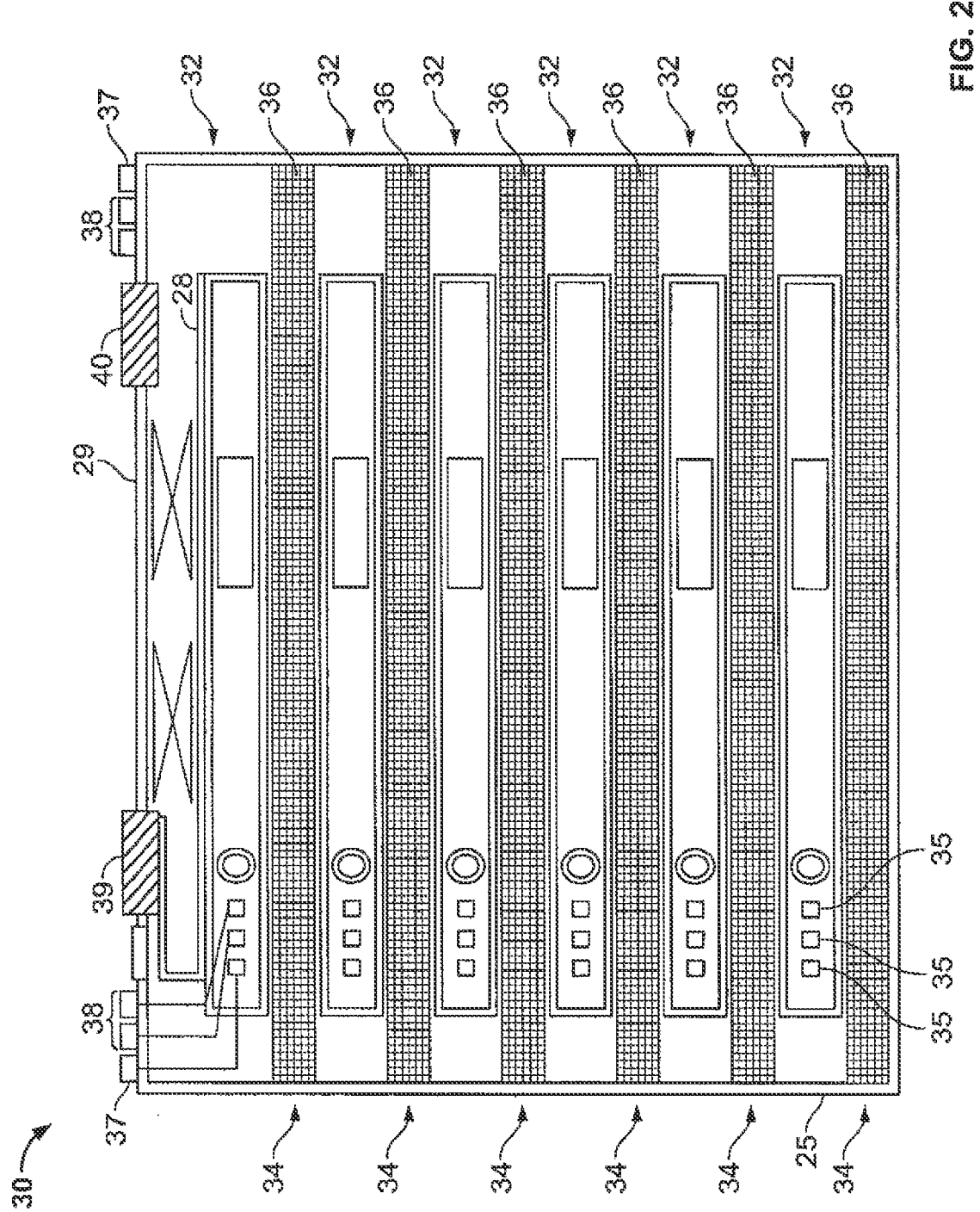
FIG. 2 schematically shows an electric battery for charging according to an embodiment of the present invention.
Figure 4:
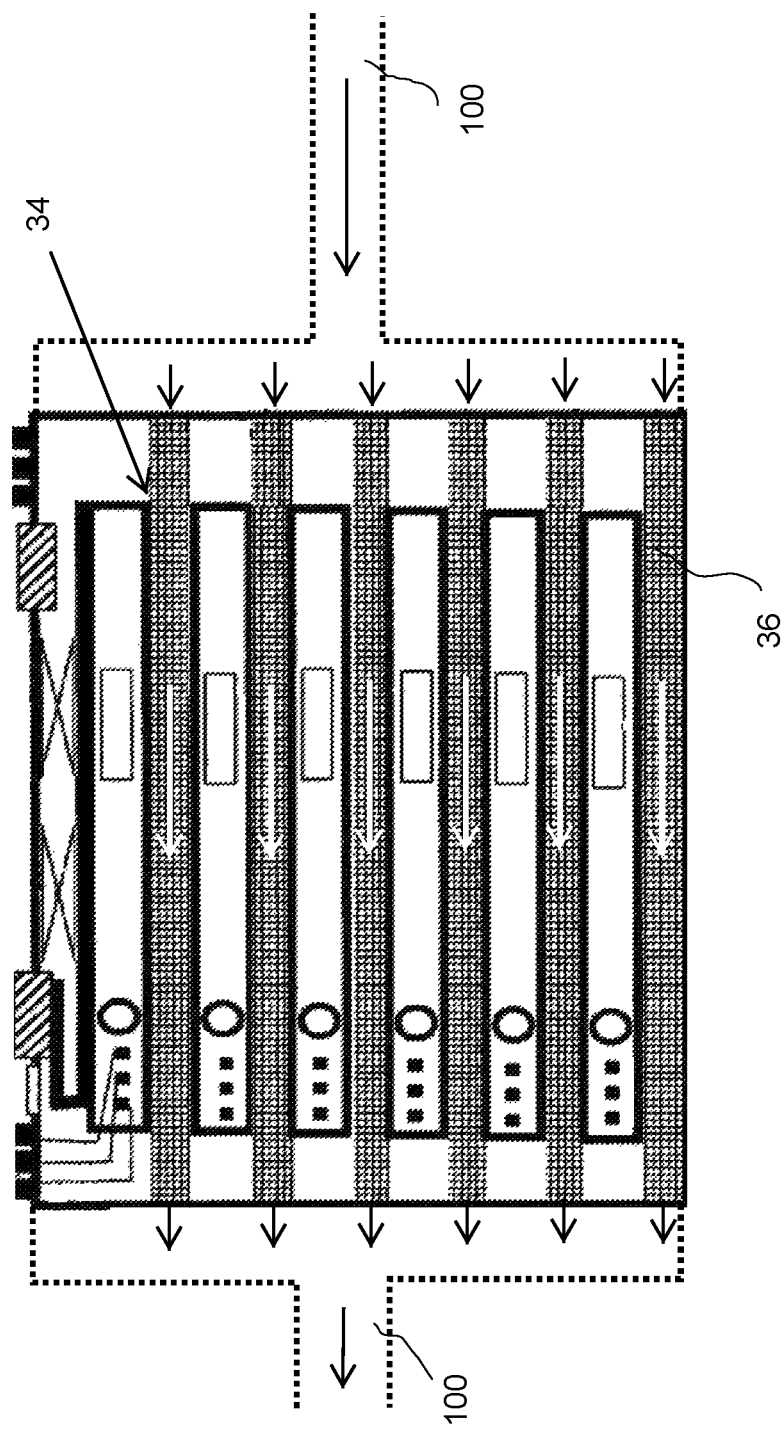
FIG. 4 schematically shows coolant flowing through interconnectors of the electric battery shown in FIG. 2.

FIG. 2 shows one exemplary embodiment of electric battery 30 in more detail. Electric battery 30 may be a modular battery including a plurality of battery cells 32 separated by a plurality of internal channels 34 in battery 30 in between cells 32. Channels 34 are preferably at least partially filled with porous compressible interconnectors 36, which act to provide an electrically-conducting interconnection between adjacent cells 32 while also allowing coolant to be passed through internal channels 34 between cells 32 to cool cells 32 during charging. FIG. 4 schematically shows coolant 100 flowing through channels 34 and through interconnectors 36 of the electric battery 30. In preferred embodiments, battery 30 is the battery disclosed in U.S. Pub. No. 2009/0239130, which is hereby incorporated by reference herein, with interconnectors 36 and cells 32 being formed in the same manner as the interconnectors and the planar cell modules, respectively, disclosed in U.S. Pub. No. 2009/0239130. Cells 32 each include a positive and a negative electrode, with the positive electrodes connecting to a positive terminal 39 and the negative electrodes connecting to a negative terminal 40.

Compressible interconnectors 36 can be made any material that has sufficient properties such as, for example a wire mesh, metal or carbon fibers retained in a compressible elastomeric matrix, or an interwoven conducting mat, consistent with the requirement for a compressible flexible electrically-conducting interconnection between adjacent cell plate module surfaces while maintaining sufficient spacing for coolant to be passed through internal channels 34 to cool cells 32 during charging. In the illustrative example in FIG. 2, six cells 32 are contained in a stacked array within an enclosure 25 which, in this embodiment, is of rectangular cross section. Although only six cells 32 are shown, battery 30 may include tens to hundreds of cells interconnected to make a very high-voltage battery stack. Enclosure 25 includes inputs and outputs, which may be automatically opened or closed, allowing coolant to be passed through channels 34.

In alternative preferred embodiments, interconnectors 36 may not be electrically and/or thermally conductive, but may simply be provided between cells 32 to space cells 32 apart from each other to form channels 34 between cells. In these embodiments, cells 32 may be formed as insulating pouches with conductive tabs at the ends thereof which allow coolant passing through channels 34 formed by interconnectors 36 to cool cells 32.

The power terminals 39, 40 connect internally to the ends of the cell module battery stack through an internal power bus 28 for the positive terminal 39 and electrically conductive enclosure 25 may serve as a negative bus 29 to negative terminal 40 or a negative bus may additionally be provided for negative terminal 40. Enclosure 25 may provided with external multipin connectors 37, 38, which may be electrically connected by sense lines to electrical feed throughs 35, for monitoring cell voltage and cell temperature, respectively. One set of multipin connectors 37, 38 may be provided for each cell 30. In order to provide cell voltage and cell temperature information for controlling the charging of battery 30, multipin connectors 37, 38 may transmit voltage and cell temperature measurements to controller 28 (FIG. 1).

Referring back to FIGS. 1a, 1b, electric batteries 30 may be each coupled to controller 28 in military device 20, which may determine the state of battery 30 and regulate the operation and charging of batteries 30 accordingly.

In FIG. 1a, charging station 10a is located on a military base 100 or a supermarket or other convenient place and is stationary or non-mobile and may be used for charging handheld military or non-military devices, which may be for example handheld computers 20a. Charging station 10a may include a high power charging source 12 for rapidly charging battery 30 and a coolant source 14 for supplying coolant internally to battery 30 via channels 34 (FIG. 2) as battery 30 is rapidly charged by high power charging source 12, which in a preferred embodiment is a high powered DC power source such as an AC/DC power supply connected to a standard AC electrical supply or a diesel-generator, or alternatively a battery, a bank of batteries or super capacitor capable of discharging at high rates and being recharged with off-peak electricity, which is cheaper and less likely to cause power grid disruptions. When charging source 12 includes a battery, a bank of batteries or super capacitor supplying power to battery 30, charging source 12 includes a gas or liquid cooling system as described herein for battery 30 to reduce an undesirable rise in temperature of the battery, bank of batteries or super capacitor of charging source 12. The amount of cooling required by the charging source battery 12 will depend upon the relative size of the battery, bank of batteries or super capacitor of charging source 12 compared to the battery 30 being charged. If the battery, bank of batteries or super capacitor of charging source 12 is ten times larger in battery capacity than the capacity of the battery 30 being charged then no active cooling of the battery, bank of batteries or super capacitor of charging source 12 may be required. A person may bring handheld computer 20a to charging station 10a, which in this embodiment is stationary, but in other embodiments may be mobile, and plug a connector 18c of a supply line 18 of charging station 10a into a receptacle 27 in handheld computer 20a. In the embodiment shown in FIG. 1a, supply line 18 extends outside of a base portion 22 of rapid charging station 10a and includes an electrical supply line 18a coupled to high power charging source 12 and a coolant supply line 18b coupled to coolant source 14. Connector 18c may be inserted into receptacle 27 of handheld device 20 such that connector 18c is temporarily locked into place in receptacle 27. After charging station 10a begins charging, rapid charging station 10a provides current from high power charging source 12 and coolant from coolant source 14 to battery 30 until battery 30 is sufficiently charged. In one preferred embodiment of the present invention, rapid charging station 10a may charge battery in less than 15 minutes. During charging, sufficient coolant may be pumped from coolant source 14 through supply line 18 and coolant conduit 26 into battery 30 as current is supplied from high power charging source 12 through supply line 18 and electrical conduit 24 to absorb a portion of the heat generated within battery 30 and prevent battery 30 from being damaged or destroyed during the charging due to an undesirable rise in temperature.

For non-military devices rapid charging station 10a could be located near or within a supermarket or other convenient public location for rapid charging of devices including for example electric scooters, golf carts, bicycles, laptop computers and phones. Stationary or non-mobile charging station 10a may be sufficiently powerful to rapidly charge a much larger battery such as an electric vehicle battery, for example a 30 kWh electric vehicle, and may be used to rapidly recharge an off-board or on-board electric vehicle battery. Rapid recharging of an electric vehicle battery removed from the electric vehicle (off-board) using rapid charging station 10a may avoid the need to replace the removed electric vehicle battery with another that is prior fully charged at a slower recharge rate thereby reducing the requirement for a large fully-charged replacement battery standing by or in inventory. These examples illustrate the benefits of embodiments the present invention for reducing the number of replacement batteries needed for a variety of battery powered military and non-military applications. The availability and convenience of rapid recharging stations diminishes the need for purchasing extra batteries and the longevity provided by the multiple rechargeability of batteries utilizing embodiments of the present invention may provide environmental and strategic benefits for the United States by reducing battery raw materials importation and processing thereof. For military applications the present invention may help reduce battery stockpiles and logistical battery inventories.

Figure 7:
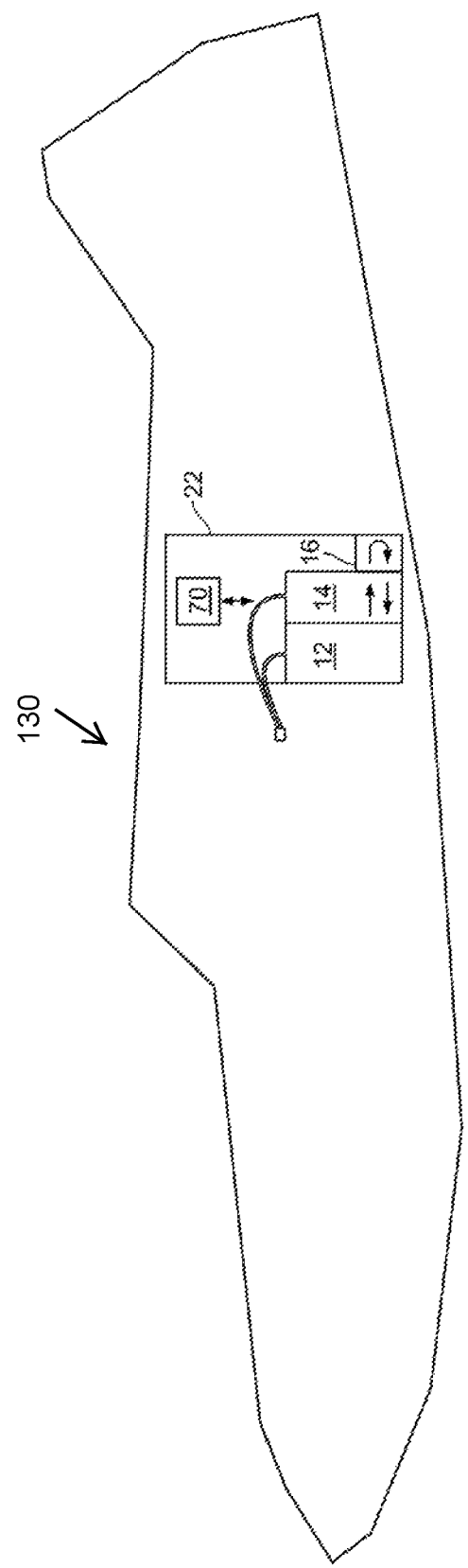
FIG. 7 schematically shows an aircraft as a mobile rapid battery charging station.
Figure 8:
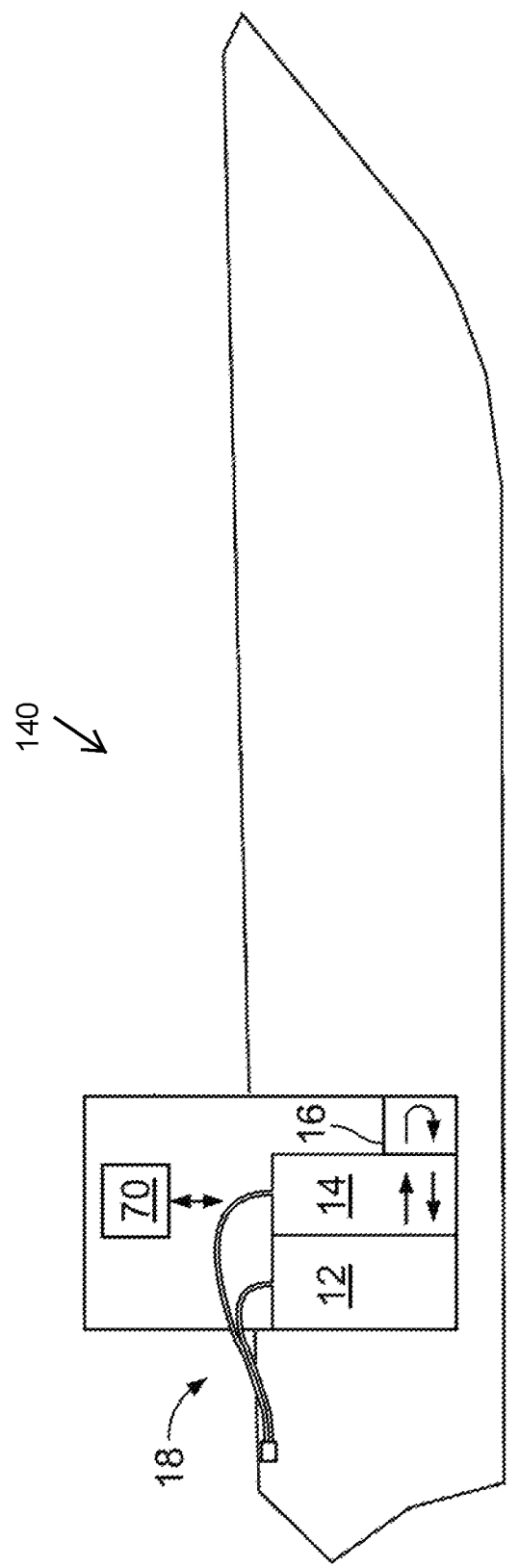
FIG. 8 schematically shows a marine vehicle as a mobile rapid battery charging station.

In FIG. 1b, charging station 10b is a mobile charging station, a so called mule, which may be strategically moved to locations where electric batteries 30 of military devices 20 need to be rapidly charged in order to allow electric batteries 30 of military devices 20 to be rapidly charged between overnight or standard charges (i.e., charges in which batteries 30 are charged slowly by stationary charging stations for multiple hours). For example, mobile charging stations 10b may be ground vehicles, aircraft 130, as schematically shown in FIG. 7, or marine vehicles 140, as schematically shown in FIG. 8, or may be included on or in (either integrally or removably) ground vehicles, aircraft or marine vehicles. In this embodiment, military device 20 is a command station 20a.

In a further embodiment, mobile rapid recharging station 10b is included with an Integrated Generator-Environmental Control Unit (ECU)-Trailer (ITEG or GET) for military life-support, command and control systems in forward operations centers. The cool air generated by the ECU of the ITEG or GET Trailer is passed through the channels 34 of battery 30 to cool the battery without the need for battery coolant source 14. With reference to FIG. 1b, high power charging source 12 may be the Integrated Generator of the ITEG or GET Trailer and coolant source 14 may be replaced by the ECU, allowing battery 30 to be rapidly recharged for use as a mobile rapid recharging station. Mobile charging stations of the present invention can be used to recharge batteries in non-mobile or other mobile devices including vehicles, boats, ships and aircraft. For non-military devices a mobile rapid charging station could be deployed in emergencies to distant devices with depleted battery energy such as stranded electric vehicles and remote UPS back-up facilities.

Mobile charging stations 10b may include high power charging source 12 for rapidly charging battery 30 and coolant source 14 for supplying coolant internally to battery 30 via channels 34 (FIG. 2) as battery 30 is rapidly charged by high power charging source 12. Mobile charging station 10b may be moved to the location of one or more of military devices 20 and connector 18c on the end of a supply line 18 of mobile charging station 10b may be inserted either manually or automatically or robotically into a corresponding receptacle 27 of military device 20. In the embodiment shown in FIG. 1b, supply line 18 extends outside of a base portion 22 of mobile charging station 10b and includes an electrical supply line 18a coupled to high power charging source 12 and a coolant supply line 18b coupled to coolant source 14. Connector 18c may be inserted into receptacle 27 of command station 20b such that connector 18c is temporarily locked into place in receptacle 27. After mobile charging station 10b begins charging, rapid charging station 10b provides current from high power charging source 12 and coolant from coolant source 14 to battery 30 until battery 30 is sufficiently charged. In one preferred embodiment of the present invention, mobile charging station 10b delivers up to 300 kW to command center 20b and may accordingly charge a 600 Volt, 30 kWh embodiment of battery 30, in approximately 6 minutes. During the approximately 6 minutes of rapid charging of the 30 kWh embodiment of battery 30, approximately 50 kW of heat may be generated by cells 32 of the 30 kWh embodiment of battery 30. Without coolant being provided preferably internally to the 30 kWh embodiment of battery 30 during such rapid charging, battery 30 may become permanently damaged or destroyed due to an undesirable rise in temperature. Accordingly, sufficient coolant may be pumped from coolant source 14 through supply line 18 and coolant conduit 26 into battery 30 as current is supplied from high power charging source 12 through supply line 18 and electrical conduit 24 to absorb a portion of the heat generated within battery 30 and prevent battery 30 from being damaged or destroyed during the charging due to an undesirable rise in temperature.

Accordingly, a method for recharging military devices 20 each having an electric battery 30 may include moving the mobile charging station 20b, via a ground vehicle, an aircraft or a marine vehicle, to a location of a first military device, then connecting the connector 18c to receptacle 27 of the first military device. The first military device may be one of a land combat or transportation vehicle, a stationary artillery device, a device carried by military personnel or a component of a command station. The method may then include recharging electric battery 30 of the first military device via the mobile charging station 20b by supplying electricity from the charging source 12. The electric battery 30 of the first military device including a plurality of cells 32 stacked inside of an enclosure 25, as shown in FIG. 2. The recharging may include delivering coolant from the coolant source 14 through the connector 18c to the first military device to cool the electric battery 30 so that coolant flows through the enclosure 25. The method may then include moving the mobile charging station 20b, via the ground vehicle, the aircraft or the marine vehicle, to a location of a second military device for recharging an electric battery 30 of the second military device.

In an alternative embodiment, in particular for use when the coolant provided by coolant source 14 is oil or another liquid, but also possibly when the coolant provided is air or another gas, a coolant return conduit may be provided in each of military devices 20 at the output ends of channels 34 to cycle the coolant that has been passed through battery 30 back through supply line 18 into coolant source 14. In this alternative embodiment, an additional coolant return line, either integral with supply line 18 or independent of supply line 18, may also be provided between military device 20 and rapid charging station 10a, 10b to recycle the coolant back into coolant source 14. Rapid charging stations 10a, 10b may then be provided with a heat exchanger for removing the heat generated within battery 30 from the recycled coolant.

In another alternative embodiment, instead of rapid charging stations 10a, 10b including single supply line 18, current from high power charging source 12 and coolant from coolant source 14 may be provided to military devices 20 separately, such that two independent supply lines are provided between rapid charging station 10a, 10b and military devices 20. For example, the two independent supply lines may be a cable coupled to high power charging source 12 having a connecting plug for removable attachment to an electrical receptacle coupled to electrical conduit 24 and a hose coupled to coolant source 14 having a connecting nozzle for removable attachment to a separate coolant receptacle coupled to coolant conduit 26. In further embodiments of the present invention a supply line may only be used for coolant source 14 and high power charging source 12 may wirelessly charge battery 30 through inductive charging or magnetic resonance charging. In another alternative embodiment, a separate coolant return may be provided and connected to a heat exchanger in rapid charging stations 10a, 10b.

Rapid charging stations 10a, 10b may each include a controller 70 for controlling the amount of charge supplied to battery 30 from high power charging source 12 and to control the amount of coolant supplied to battery 30 from coolant source 14 (and back into coolant source 14 in embodiments where the coolant is recycled). As military devices 20 are connected to mobile charging stations 10a, 10b for charging battery 30, controller 70 may be brought into communication with controller 28 of battery 30 such that controller 70 can regulate the supply of charge from high power charging source 12 and the supply of coolant from coolant source 14 according to the present state of battery 30. For example, if due to the weather conditions or the manner in which military device 20 has been driven, battery 30 is warmer or cooler than usual (for example as measured by connectors 37, 38 shown in FIG. 2), the supply rate and/or temperature of coolant from coolant source 14 may be increased or decreased accordingly. Also, if battery 30 is partially charged and only needs to be charged a small amount, controller 70 can limit the supply of charge from high power charging source 12 to below the maximum charging rate and adjust the flow rate and/or temperature of coolant from coolant source 14 to a corresponding value. Controller 70 may include a memory that correlates the amount of coolant to be supplied to the charge supplied and also optionally to the temperature of battery 30. Controller 28 may also provide controller 70 with information regarding the present chemistry and history of battery 30, as sensed at battery 30, and controller 70 may control the charging and cooling of battery 30 based on the chemistry and history of battery 30 to allow for the safest protocols for recharging battery 30. For example, an older battery 30 may not take the fastest recharging rates or may have a slightly different chemistry and may be charged by mobile charging station 10a, 10b according to preset charging and cooling rates stored in controller 70.

In one example, battery 30 is a 300 Volt electric battery weighing 100 kg and after a full charge may supply 30 kWh to military device 20. In this example, high power charging source 12 fully charges battery 30 in ten minutes, at 180 kW and battery 30 includes one hundred 3V cells 32 each having a resistance of 1 milliohm. The charging generates approximately 36 kW of heat for 10 minutes (~6 kWh). In order to sufficiently cool battery 30 during such charging to maintain an acceptable temperature of approximately 45 degrees Celsius, coolant source 14 may provide oil (supplied at 20 degrees Celsius) at a rate of at least 0.73 liters per second (44 liters per minute) or may provide air (supplied at 0 degrees Celsius) at a rate of at least 1800 cubic feet per minute. Across the industry, electric battery charge and discharge rates are referred to using a normalization called a C-rate (C=capacity of the battery). Regardless of the size of an electric battery, a 1 C rate on charge or discharge means the battery is fully charged or discharged or discharged in 1 hour. For example a C/8 rate would indicate an eight hour charge or discharge and 2 C rate would indicate a half hour charge or discharge. Accordingly, for the above example of charging in ten minutes, battery 30 would have a C-rate of 6 C.

In another example, to charge a 600 Volt, 24 kWh embodiment of battery 30 in six minutes, high power charging source 62 may be a 240 kW charger, delivering 400 Amps at 600 Volts (DC) for six minutes. Due to substantial heat losses, the power delivered may have to be much higher than if the charging was completely efficient. For example, if there were two hundred cells of 3 Volts each, with a resistance each of one milliohm, there may be 32 kW of heat generated, and an additional minute of charging (approximately seven minutes total) may be necessary.

In one embodiment, instead of fully charging battery 30 to 100% of its charge capacity using high power charging source 12, battery 30 may be charged by high power charging source 12 to 80% of its charge capacity in approximately five minutes. This approach of 80% charging may prevent overvoltages in some cells of battery 30. Charging over 80% of the charge capacity of battery 30 may then be accomplished if desirable by tapering down the current supplied by charging source 12 after battery 30 is charged to 80% of its charge capacity. In order to charge the 600 Volt, 24 kWh embodiment of battery 30, after being fully discharged, having two hundred cells of 3 Volts each, with a resistance each of one milliohm, to 80% capacity (19.2 kWh) in five minutes, 2.7 kWh of heat (32 kW over five minutes $\sim 10^7$ Joules) would be generated in battery 30. In order to sufficiently remove 2.7 kWh of heat in five minutes, oil may be passed internally through channels 34 of battery 30 at a minimum of 40 liters/min or air may be passed internally through channels 34 of battery 30 at a minimum of 1600 cubic ft/min. In order to compensate for the inherent delay in heat transfer to the coolant, in preferred embodiments of the present invention, oil or air is passed through at higher rates than the minimum. In these embodiments, for the above mentioned 600 Volt battery, oil may be passed internally through channels 34 of battery 30 at approximately 50 to 200 liters/min or air may be passed internally through channels 34 of battery 30 at approximately 2000 to 8000 cubic ft/min. The cooling rates for larger or smaller batteries may be proportionately higher or lower, respectively.

A refrigeration unit 16 may be included in rapid charging stations 10a, 10b for further cooling the air or oil used to cool battery 30. In particular, refrigeration unit 16 may be particularly advantageous for cooling air and may allow air to be passed internally through channels 34 of battery 30 at rates lower than approximately 2000 to 8000 cubic ft/min.

In some embodiments, after battery 30 is rapidly charged by rapid charging station 10a or 10b, battery 30 may be internally air-cooled or heated by passing air through interconnectors 36. The air may be supplied using blown air from an existing on-board air conditioning or air-heating system (HVAC) present on certain embodiments of military device 20 (e.g., at least some of the transportation and combat vehicles). For instance, air-blown heating may be used during the coldest days of winter months for efficient and rapid battery warm up, which is advantageous because batteries loose considerable capacity at low temperatures. Then, as the battery heats up to the normal operating temperature, any waste heat generated thereafter may be used for space heating or cooling (e.g., via a small heat pump), thereby utilizing otherwise wasted energy and controlling the rising of the temperature of battery 30 during accelerating and braking transients. In an alternative embodiment, after battery 30 is charged by rapid charging stations 10a, 10b, battery 30 may be internally liquid-cooled or liquid-heated by passing liquid through interconnectors 36 from an on-board liquid heat-exchanger cooled or heated respectively by an on-board refrigeration or heating system.

In one embodiment of the present invention, coolant conduit 26 and the coolant return conduit, if provided, may be incorporated into the HVAC system present on certain embodiments of military device 20 (e.g., at least some of the transportation and combat vehicles). Accordingly, coolant conduit 26 and the coolant return conduit may be used for thermal management of battery 20 to pass coolant through channels 34 (FIG. 2) during the operation of military device 20 and then for cooling of battery 30 with coolant supplied by rapid charging stations 10a, 10b and passed through channels 34 during rapid recharging. Switching valves could be provided to alternately couple the coolant conduit 26 and the coolant return conduit to the HVAC system during operation of military device 20 and to supply line 18 during charging.

Additionally, for example, the thermal energy removed from battery 30 by the coolant passing through battery 30 may be converted into electricity in either military device 20 or rapid charging stations 10a, 10b. For example, turbine or thermoelectric devices of military device 20 or turbine or thermoelectric devices in rapid charging stations 10a, 10b may be coupled to outlets of channels 34 to recapture energy in the coolant downstream of battery 30.

In preferred embodiments, battery 30 contains nanoscale particles which fundamentally allow for high charging rates. The nanoscale particles may be coated with a thin layer of carbon. For example, anodes of cells 32 may be formed of lithium titanium oxide (LTO) nanoparticles and cathodes of cells 32 may be formed of lithium iron phosphate (LFP) nanoparticles, such that battery 30 may be rapidly recharged at up to the 3 minute rate (i.e., 20 C-rate) and may also cycle for many thousands of times such that no battery replacement may be required during the life of military device 20. For example, the use of such nanoparticles in battery 30 when combined with the present invention which limits the temperature rise in battery 30 may allow battery 30 to be rapidly charged more than 10,000 times. Such battery longevity would yield a high salvage value for battery 30. Such battery longevity would also provide environmental and strategic benefits for the United States by reducing battery raw materials importation and processing thereof and by reducing battery stockpiles and logistical battery inventories.

Coolants other than air or oil may also be supplied by coolant source 14. For example, flowable liquid or gaseous materials having optimal heat capacity may used. The coolant may be supplied with additives to increase heat exchange capabilities. In one preferred embodiment, the coolant is electrically insulating.

In further embodiments of the present invention, stationary rapid charging stations may be used and the military devices 20 may be transported, possibly via an additional vehicle, to the stationary rapid charging stations. Also, in further embodiments, battery 30 may be removed from the military device 20 and replaced with a backup battery while battery 30 is charged by mobile charging station 10b or taken to a stationary charging station for charging. In even further embodiments, military device 20 may include two or more batteries 30 and one of the batteries may power military device 20 while the other battery 30 is charged.

Figure 3:
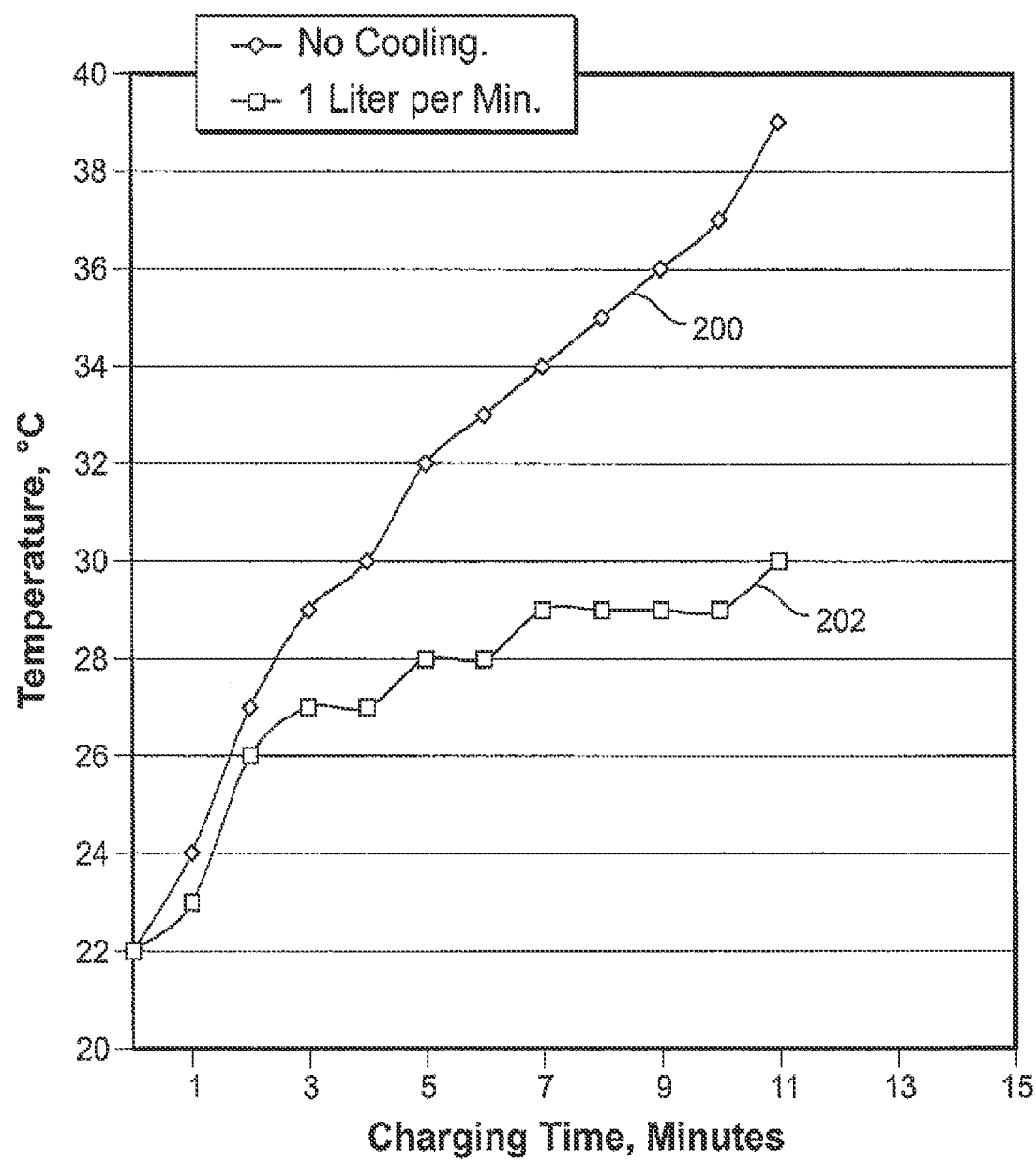
FIG. 3 shows a graph plotting battery temperature versus time for a three-cell battery rapidly charged at a 20 minute rate.

FIG. 3 shows a graph plotting battery core temperature versus time for a three cell battery rapidly charged at a 20 minute rate (i.e., 3 C-rate). The three cell battery includes electrically conductive interconnectors 36 (FIG. 2) between the cells. A line 200 plots the temperature of the three cell battery versus time without any coolant flowing through interconnectors 36 and a line 202 plots the temperature of the three cell battery versus time with coolant being pumped into the battery, through interconnectors 36, at a rate of one liter per minute. In this experiment, the coolant used was a commercial heat-transfer fluid, Paratherm LR, a paraffinic hydrocarbon with a broad operating range (i.e., between −50 and 230 degrees Celsius). Paratherm LR has a specific resistance of around 10E14 ohm cm, and the dielectric breakdown voltage (per ASTM D1816-04, 0.1 inch gap) is over 22 kV, which was sufficient to prevent damage to the electrical components of the battery for example by electrical shorting which would also cause inefficient charging. The graph illustrates that pumping coolant into a battery limits the temperature of the battery. As shown in FIG. 3, without cooling, the battery is heated from 22 degrees Celsius to 30 degrees Celsius in approximately 4 minutes and is heated to approximately 39 degrees Celsius in approximately 11 minutes. In contrast, with coolant being pumped through the battery, the battery does not reach 30 degrees Celsius until the battery has been heated for 11 minutes. Accordingly, the temperature increase in the cooled battery is less than half of the temperature increase of the uncooled battery (8 degrees Celsius vs. 17 degrees Celsius). Further properties of Paratherm LR are shown in the below chart.

| Chemical name | Paraffinic hydrocarbon |
| --- | --- |
| Maximum Recommended Film Temperature | 500° F./260° C. |
| Maximum Recommended Operating Temperature | 450° F./232° C. |
| Minimum Operating Temperature 20 cPs (20 mPa-s) | −58° F./−50° C. |
| Minimum Start-up Temperature 300 cPs (300 mPa-s) | −112° F./−80° C. |
| Viscosity at 60° F. cSt (mm$^2$/sec) | 2.4 |
| Density at 60° F./15.5° C. lb/gal (kg/m$^3$) | 6.4 (766) |
| Flash Paint Closed Cup (D56) | >130° F./54° C. |
| Autoignition Temperature (maximum 10 sec ignition delay) | >500° F./260° C. |
| Boiling Point (14.7 psia/101 kPa) | 397° F./202° C. |
| Vapor Pressure @ maximum operating temperature psia (kPa) | 21 (145) |
| % Volume expansion over recommended operating temperature per 100° F. (° C.) | 6.8 (12.2) |
| Average Molecular Weight | 160 |
| Dielectric Breakdown voltage D1816-04 (kV, 0.1" gap) | 22.15 |
| Dielectric Constant (1 KHz) D924-04 | 2.03 |
| Dissipation Factor (1 KHz) D924-04 | 0.00001 |
| Volume Resistivity at 100 V (Ω-cm) D257-07 | 1.84 × 10$^{14}$ |
| Heat of combustion (approximate) BTU/lb (kJ/kg) | 20,000 (46,300) |
| Heat of vaporization (approximate) Btu/lb (kJ/kg) | 113 (262) |

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A mobile charging station comprising:
a base portion comprising:
a charging source providing an electrical charge;
a coolant source providing coolant;
a supply line connected to the charging source and the coolant source and extendible outside of the base portion; and
a connector fixed to an end of the supply line, the connector being configured for insertion into a receptacle of a military device, the supply line including a coolant supply line configured for delivering coolant from the coolant source to the connector, the supply line including an electrical supply line configured for delivering electrical charge from the charging source to the connector, the connector having both an electrical supply section connected to the electrical supply line for delivering the electrical charge and a coolant supply section connected to the coolant supply line for delivering the coolant, and the connector being configured for connecting to the military device, the mobile charging station being or included on or in a ground vehicle, an aircraft or a marine vehicle.

2. The mobile charging station as recited in claim 1 further comprising a controller configured for regulating the supply of charge from the charging source high power charging source and the supply of coolant from the coolant source according to a present state of a battery of the military device during charging.

3. The mobile charging station as recited in claim 1 wherein charging source is configured for delivering up to 300 kW per electric battery.

4. The mobile charging station as recited in claim 1 wherein charging source is at least one battery or a super capacitor.

5. The mobile charging station as recited in claim 1 wherein coolant source includes an electrically insulating oil.

6. A method for recharging military devices each having an electric battery, the method comprising:
moving the mobile charging station, via a ground vehicle, an aircraft or a marine vehicle, to a location of a first military device, the mobile charging station including a coolant source, a charging source, a supply line connected to the charging source and the coolant source, and a connector connected to an end of the supply line;
connecting the connector to a receptacle of the first military device, the first military device being one of a land combat or transportation vehicle, a stationary artillery device, a device carried by military personnel or a component of a command station;
recharging an electric battery of the first military device via the mobile charging station by supplying electricity from the charging source, the electric battery of the first military device including a plurality of cells stacked inside of an enclosure, the recharging including delivering coolant from the coolant source through the connector to the first military device to cool the electric battery so that coolant flows through the enclosure; and
moving the mobile charging station, via the ground vehicle, the aircraft or the marine vehicle, to a location of a second military device for recharging an electric battery of the second military device.

7. The method as recited in claim 6 wherein the battery includes interconnectors spacing the cells apart, the delivering coolant to the military device to cool the electric battery including delivering coolant through the interconnectors.

8. The method as recited in claim 6 wherein the first military device is a land combat or transportation vehicle.

9. The method as recited in claim 6 wherein the first military device is a stationary artillery device.

10. The method as recited in claim 6 wherein the first military device is a device carried by military personnel.

11. The method as recited in claim 6 wherein the first military device is a component of a command station.

12. The method as recited in claim 6 wherein the recharging uses an electrical power that is more than 100 Watts.

13. The method as recited in claim 6 wherein the recharging takes less than an hour.

14. The method as recited in claim 6 wherein the electric battery of the first military device and the electric battery of the second military device are each recharged to at least 50% capacity.

15. The method as recited in claim 6 wherein the coolant is gas supplied at 0.1 cubic ft/min or greater.

16. The method as recited in claim 6 wherein the coolant is liquid supplied at 0.01 liters/min or greater.

17. The method as recited in claim 6 wherein the cells are spaced apart from each other by channels, the recharging including delivering coolant to the military device to cool the electric battery so that coolant flows through the channels and cools the cells.

* * * * *